US 8,803,345 B2

(12) United States Patent
Yokokawa et al.

(10) Patent No.: US 8,803,345 B2
(45) Date of Patent: Aug. 12, 2014

(54) INVERTER GENERATOR

(75) Inventors: Narutoshi Yokokawa, Mishima (JP);
Junichi Kanai, Niigata (JP); Naoyuki Mashima, Tsubame (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 302 days.

(21) Appl. No.: 13/311,917

(22) Filed: Dec. 6, 2011

(65) Prior Publication Data

US 2012/0139239 A1    Jun. 7, 2012

(30) Foreign Application Priority Data

Dec. 7, 2010  (JP) ................................. 2010-272901

(51) Int. Cl.
  *H02P 9/00*     (2006.01)

(52) U.S. Cl.
  USPC .................... 290/7; 290/40 C; 318/400.02

(58) Field of Classification Search
  None
  See application file for complete search history.

(56) References Cited

U.S. PATENT DOCUMENTS

| 5,585,709 | A  | * | 12/1996 | Jansen et al. | ............. | 318/807 |
| 5,703,410 | A  |   | 12/1997 | Maekawa |  |  |
| 6,169,677 | B1 |   | 1/2001  | Kitahata |  |  |
| 6,320,349 | B1 | * | 11/2001 | Kaneko et al. | ............. | 318/798 |
| 7,495,411 | B2 | * | 2/2009  | Kaneko et al. | ............. | 318/801 |
| 8,030,791 | B2 |   | 10/2011 | Lang |  |  |
| 8,350,397 | B2 |   | 1/2013  | Lang |  |  |
| 8,411,472 | B2 |   | 4/2013  | Sato |  |  |
| 2011/0264331 | A1 | * | 10/2011 | Imamura et al. | ............. | 701/42 |
| 2012/0139239 | A1 |   | 6/2012  | Yokokawa |  |  |
| 2012/0229063 | A1 |   | 9/2012  | Yokokawa |  |  |
| 2012/0229065 | A1 |   | 9/2012  | Yokokawa |  |  |

FOREIGN PATENT DOCUMENTS

| JP | 2005-295626 | 10/2005 |
| JP | 2007-185099 | 7/2007 |

OTHER PUBLICATIONS

English Language Abstract of JP 2005-295626 published Oct. 20, 2005.
English Language Translation of JP 2005-295626 published Oct. 20, 2005.
English Language Abstract of JP 2007-185099 published Jul. 19, 2007.
English Language Translation of JP 2007-185099 published Jul. 19, 2007.
U.S. Appl. No. 13/311,907 electronically captured on Feb. 17, 2012.
U.S. Appl. No. 13/311,907 electronically captured on Mar. 10, 2014.

* cited by examiner

*Primary Examiner* — Michael Zarroli
(74) *Attorney, Agent, or Firm* — DLA Piper LLP (US)

(57) ABSTRACT

An inverter generator includes a motor, an electric generator and an ECU generating a pulse at each predetermined rotation angle of the motor. Estimating means estimates an initial electrical angle of alternating voltage produced by the generator from the pulse and calculates a phase shift angle to estimate continuous electrical angle of the alternating voltage. A converter converts the alternating current electric power into direct current electric power under d-q control based on the phase shift angle. An inverter converts the direct current electric power into alternating current output electric power.

6 Claims, 14 Drawing Sheets

INVERTER GENERATOR

CROSS-REFERENCE TO RELATED APPLICATIONS

This application is based upon and claims the benefit of priority from the prior Japanese Patent Application No. 2010-272901 (filed Dec. 7, 2010); the entire contents of which are incorporated herein by reference.

BACKGROUND OF THE INVENTION

1. Field of the Invention

The present invention relates to an inverter generator in which AC electric power generated by a motor is once converted into DC power and further converted into AC power with a desired frequency.

2. Description of the Related Art

A synchronous electric motor driven by a motor such as a combustion engine is used as an electric generator for generating alternating current electric power. An electric generator sometimes further contains a converter by which a generated power is once converted into a direct current electric power and then converted into alternating current electric power for output. An electric generator with such a converter, generally referred to as "inverter generator", serves some benefits such as controllability of voltage and frequency of output electricity independent of those of originally generated by the synchronous electric motor.

A converter in an inverter generator requires information about electrical angles in regard to the Synchronous electric motor to control its conversion mode. Thus an inverter generator so far needs to have additional sensors on its synchronous electric motor to inform electrical angles to its converter. JP2005-295626 and JP2007-185099 discloses related arts.

SUMMARY OF THE INVENTION

The present invention provides an inverter generator with a converter capable of estimating an electrical angle without an additional sensor on a synchronous electric motor.

According to an aspect of the present invention, an inverter generator used in combination with a motor and an ECU generating a pulse at each predetermined rotation angle of the motor is comprised of: an electric generator driven by the motor configured to generate alternating current electric power; a circuit constructed and arranged to estimate an initial electrical angle of alternating voltage of the alternating current electric power from the pulse and calculating a phase shift angle from a difference of estimated d'-q' axes from d-q axes of the alternating voltage of the alternating current electric power to estimate a continuous electrical angle of the alternating voltage of the alternating current electric power, the estimating circuit being electrically connected with the ECU; a converter configured to convert the alternating current electric power into direct current electric power under d-q control based on the phase shift angle, the converter electrically connected with the electric generator and the estimating circuit; and an inverter configured to convert the direct current electric power into alternating current output electric power, the inverter electrically connected with the converter.

DETAILED DESCRIPTION OF THE PREFERRED EMBODIMENT

Certain embodiments of the present invention will be described hereinafter with reference to the appended drawings.

Figure 1:
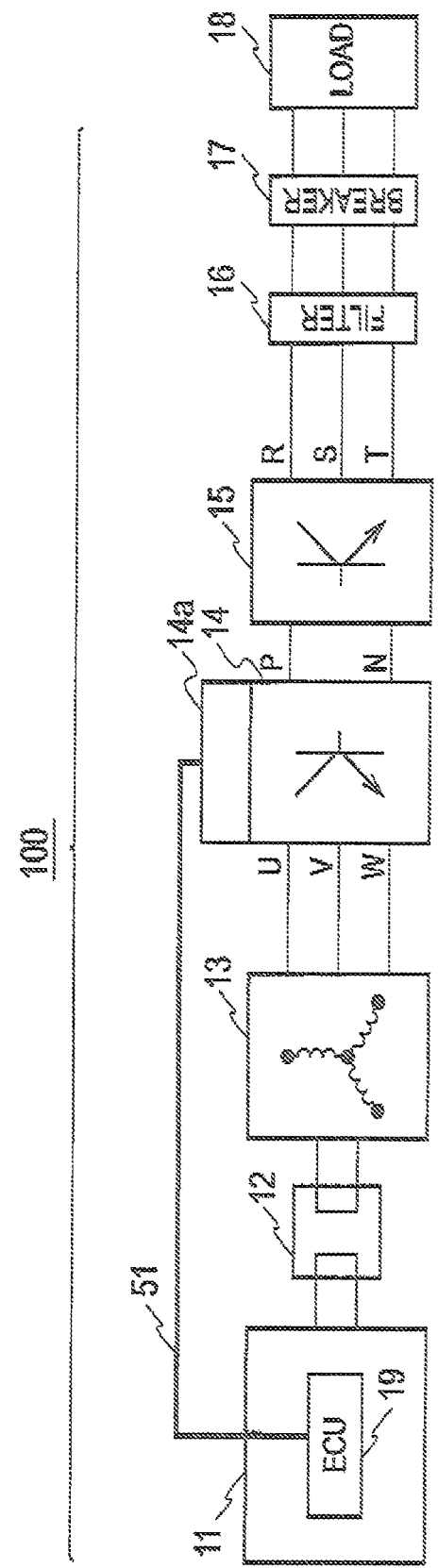
FIG. 1 is a block diagram of an inverter generator according to an embodiment of the present invention.

Mainly referring to FIG. 1, an inverter generator 100 of an embodiment of the present invention is used in combination with a motor 11 such as a diesel engine, a gasoline engine or such, and an ECU 19 installed on the motor 11. The motor 11 is drivingly coupled with an electric generator 13, to which a general three-phase synchronous electric motor may be applied, via a coupling 12, thereby generating three-phase alternating current (AC) electric power of a U-phase, a V-phase, and a W-phase. The inverter generator 100 is further comprised of a converter 14 which converts the three-phase AC electric power into a direct current (DC) electric power flowing through a positive (P) line and a negative (N) line and an inverter 15 which converts the DC electric power into three-phase AC electric power of a R-phase, a S-phase, and a T-phase. The inverter generator 100 may be further comprised of a filter 16 for the purpose of noise reduction and a breaker 17 on its RST lines, and is then connected to a load 18.

The converter 14 is comprised of switching devices, such as IGBTs or MOSFETs, and diodes in such a way that these switching devices are so structured to execute switching operation in response to current alternation, thereby converting the three-phase AC electric power into the DC electric power. Further the converter 14 may regulate current to the electric generator 13 in response to change in output to the load 18, thereby regulating electric power generation by the electric generator 13 without revving up or down the motor 11. More specifically, not only does the converter 14 rectify AC electric power but also the converter 14 has an ability to controllably generate stabilized DC electric power in response to change in output.

The converter 14 has an estimating circuit 14a for estimating electrical angles of AC voltage, electrically connected with the ECU 19. Details of the converter 14 will be described later.

The inverter 15 is comprised of switching devices, such as IGBTs or MOSFETs, and diodes, and has these switching devices are so structured as to execute switching operation in a controllable frequency, thereby converting DC electric power into three-phase AC electric power of R, S and T phases. More specifically, the inverter 15 is so constructed as to controllably change its output voltage and frequency.

The ECU 19 is not a device unique to the present embodiment but a device commonly installed on a motor for output of a signal of an impulse tachometer or a tacho-sensor. The ECU 19 generates a pulse at each predetermined rotation angle of the motor 11. The ECU 19 is electrically connected with the estimating circuit 14a via a cable 51. Thus the ECU 19 is capable of reading pulses corresponding to rotation angles of the motor 11 and then transmitting the read pulses to the estimating circuit 14a.

Figure 2:
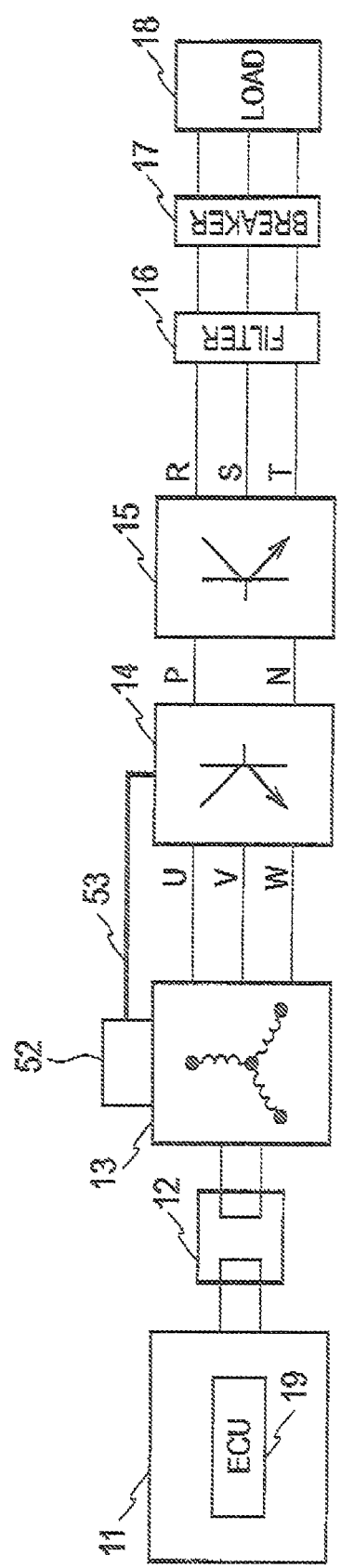
FIG. 2 is a block diagram of an inverter generator of a prior art.

In contrast, an inverter generator according to the prior art is, as shown in FIG. 2, required to have a position sensor 52 on the generator 13 to read electrical angles and a cable 53 to transmit the read angles to a converter 14. This structure was reasonable because the motor 11 does not have direct information about the electrical angles but the generator 13 does. As will be understood, the present embodiment is free from the position sensor 52 of the prior art and instead has an electrical link between the ECU 19 and the estimating means 14. As the ECU 19 with an impulse tachometer or a tacho-sensor is common in ordinary motors, the present embodiment enables electrical angle sensing without any additional equipment.

Figure 3:
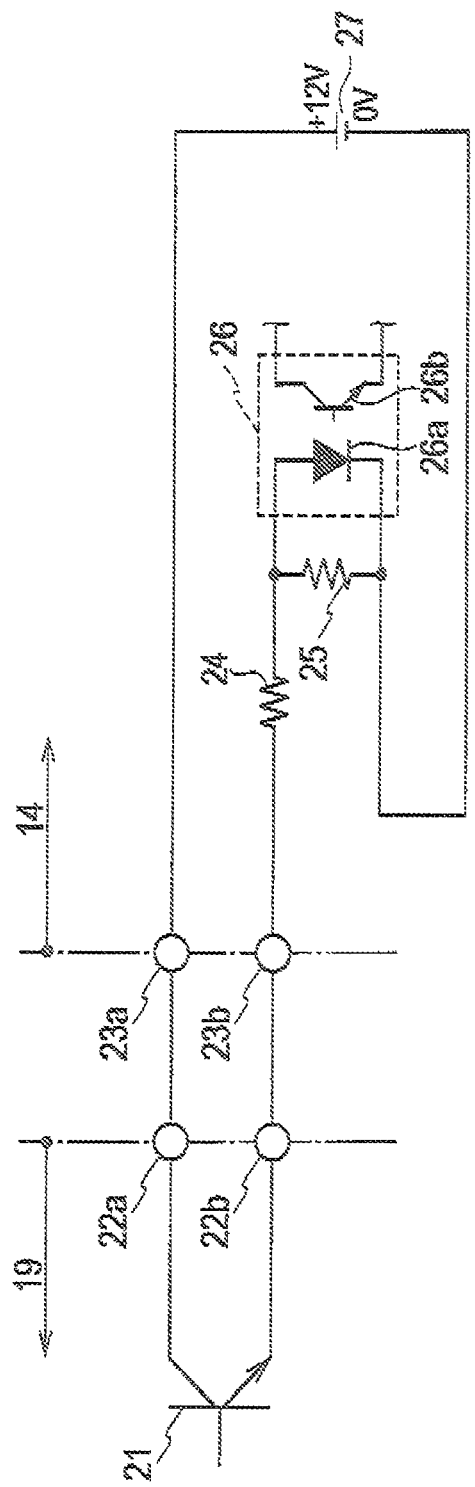
FIG. 3 is a circuit diagram of a communication circuit between an ECU and a converter of the inverter generator according to an example.

There may be some variations of connection between the ECU 19 and the estimating circuit 14a. FIG. 3 illustrates one of such variations. The ECU 19 is comprised of a transistor 21 of an open-collector type, a collector of which is electrically connected with a positive terminal of a DC source 27 in the converter 14 via terminals 22a, 23a. An emitter of which is electrically connected with a negative terminal of the DC source 27 via terminals 22b, 23b and resistors 24, connected in series.

Figure 4:
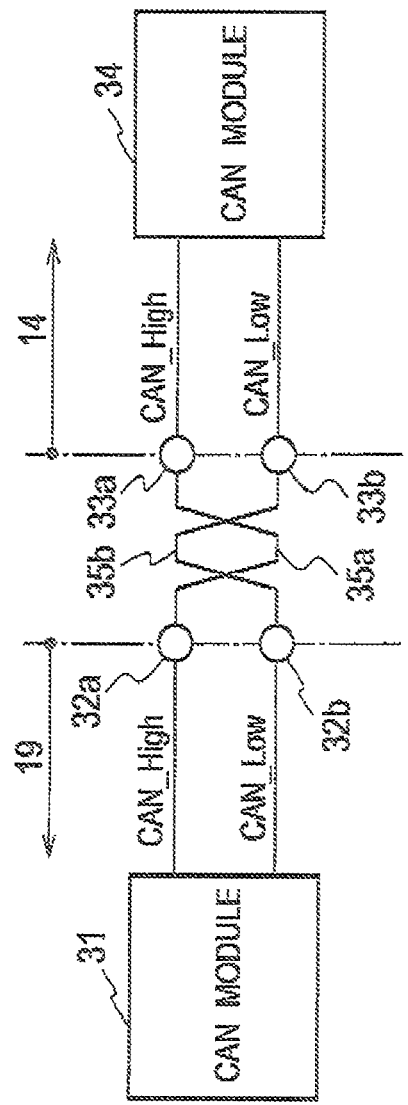
FIG. 4 is a circuit diagram of a communication circuit between an ECU and a converter of the inverter generator according to another example.

Connected in parallel with the resistor 25 is a photocoupler 26, in which a light-emitting diode 26a is connected in parallel with the resistor 25 and a phototransistor 26b is optically coupled with the light-emitting diode 26a. Thus the phototransistor 26b is capable of transmitting signals corresponding to the pulses from the ECU 19 to any device in the converter FIG. 4 illustrates another example, in which two controller area network (CAN) modules 31, 34 establish communication between the ECU 19 and the estimating circuit 14a. The CAN_High line of the CAN module 31 installed in the ECU 19 is electrically connected with the CAN_High line of the CAN module 34 installed in the estimating means 14a via a terminal 32a, a cable 35a, and a terminal 33a. The same applies to the CAN_Low lines via a terminal 32b, a cable 35b, and a terminal 33b. Thus the CAN modules 31, 34 are capable of transmitting signals corresponding to the pulses from the ECU 19 by means of CAN communication protocols.

Figure 5:
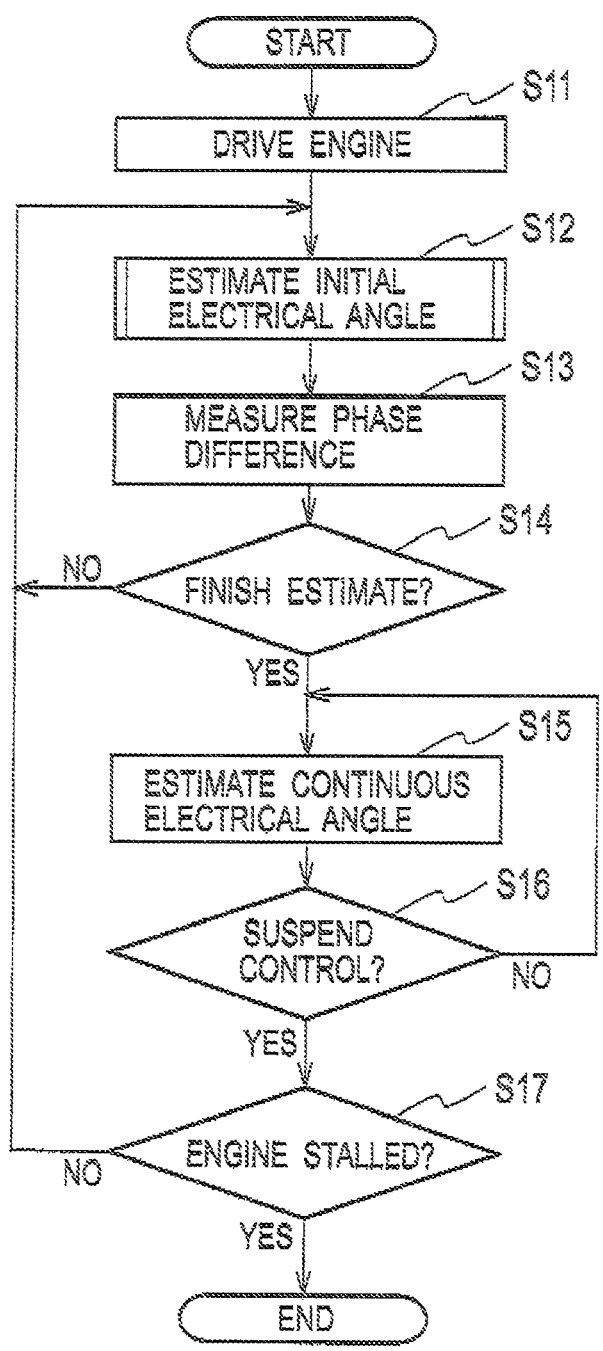
FIG. 5 is a flowchart depicting a process of estimating an electrical angle of an alternating voltage generated by a generator.

The inverter generator 100 makes the estimating means 14a execute estimation of electrical angles in a way as shown in FIG. 5.

In initial steps of working, the inverter generator 100 is made to first start the motor 11 (step S11) to drive the generator 13, and next execute estimation of an initial electrical angle of alternating voltage generated by the electric generator 12 (step S12).

Figure 6:
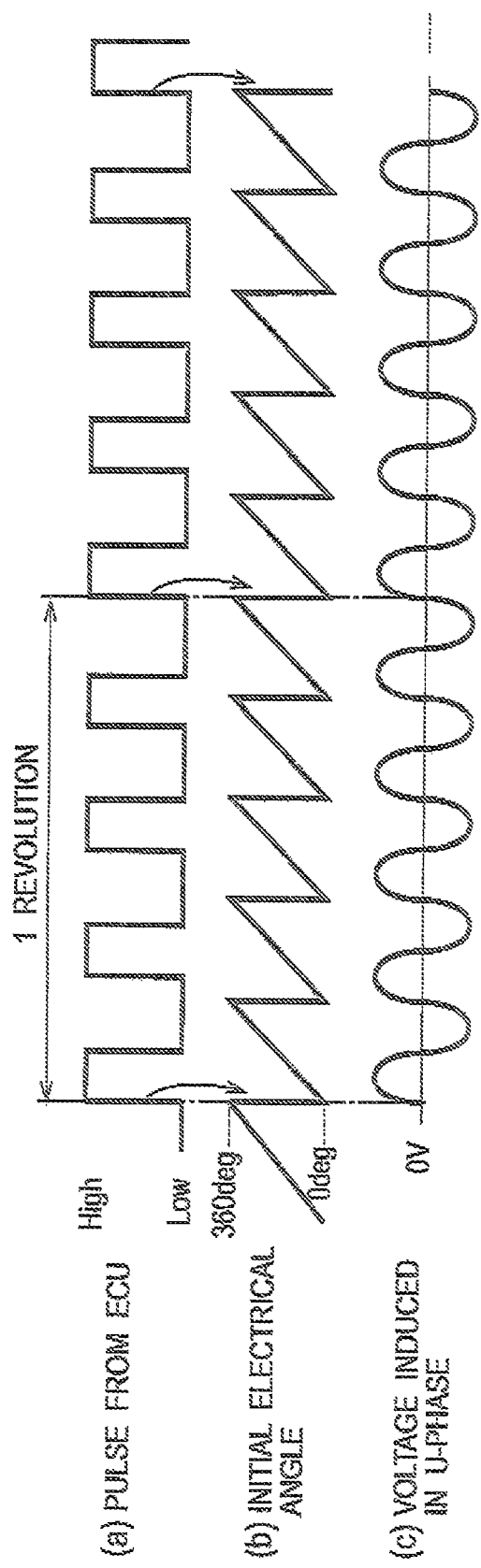
FIG. 6 is a timing chart among ECU pulses, an electrical angle, and a voltage wave induced in an electric generator in a case where rising edges of the ECU pulses form no phase shift relative to zero cross points of the voltage wave.

Referring to FIG. 6, the electrical angle continuously changes its value from 0 degrees to 360 degrees and then returns to 0 degrees. As such change reciprocates, the electrical angle forms a sawtooth waveform in synchronism with a sine-like waveform of the generated voltage, as respectively shown in the middle and the foot of FIG. 6. In contrast, the ECU 19 outputs rectangular-wave pulses (ECU pulses, hereinafter). In this example, the ECU 19 generates 4 pulses at each 5 cycles of the alternating voltage, although this ratio is not limiting but merely an example. Estimation of the initial electrical angle is to refer ECU pulses to determine a point on the sawtooth waveform. Its details will be described below with reference to FIG. 7. Meanwhile, some points where rising edges of the ECU pulses coincide with zero-cross points of the alternating voltage can be found in this example, whereas another example will be described later.

Figure 7:
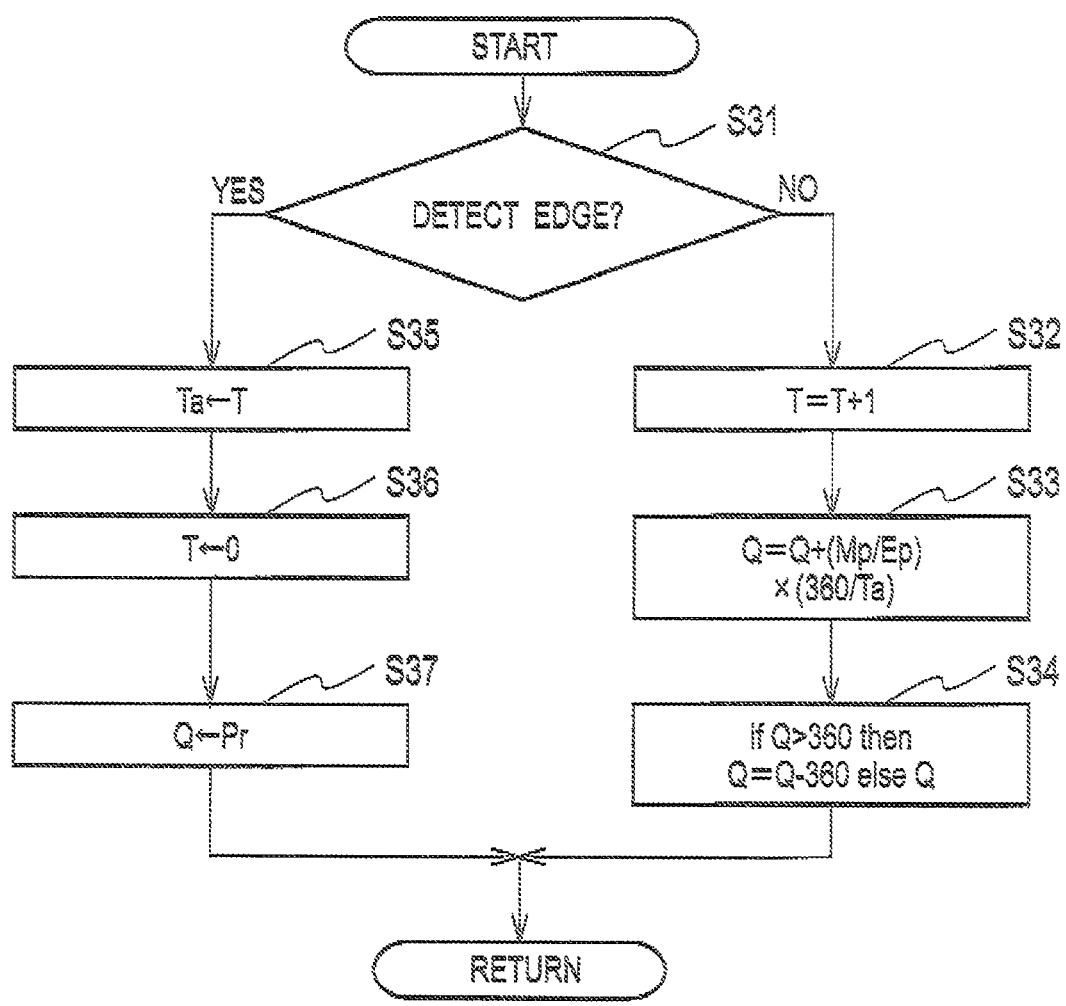
FIG. 7 is a flowchart depicting a process of estimating an initial electrical angle of an alternating voltage generated by a generator.

Referring to FIG. 7, estimation of the initial electrical angle will be described. In FIG. 7, T is a counter, Ta represents a counted value between rising edges of the ECU pulses, Q represents an electrical angle to be estimated, Pr represents a preset phase shift angle in degrees, Ep represents the number of pulses per revolution of the motor given as a constant value, and Mp represents the number of pole pairs of the electric generator given as a constant value. First the estimation circuit 14a counts the ECU pulses from the ECU 19 and, at each predetermined duration (4 counts for example), keeps waiting a rising edge of the ECU pulse. Then the estimation circuit 14a determines whether the rising edge is detected or not within the duration (step S31). This step will be reciprocated four times per revolution as the ECU 19 outputs four pulses per revolution as supposed above. Of course, the number of reciprocation and the duration depend on the circumstances.

If the rising edge is not detected (NO in the step S31), the counter T is incremented by one (step S32), and the value Q is incremented in accordance with the following formulation (step S33).

$$Q \leftarrow Q + (Mp/Ep) \times (360/Ta) \quad (1)$$

More specifically, the value Q is incremented by (Mp/Ep)× (360/Ta) per each increment in T. If the resultant value Q goes beyond 360 degrees, a balance obtained after subtracting 360 from the value Q is given to a new value Q (step S34). These increment steps are reciprocated during NO at the step S31. Then a resultant value Q is an estimated initial electrical angle. If the rising edge is detected (YES in the step S31), the value of the counter T is given to Ta (step S35) which is input into a memory.

Then the counter T is reset to be zero (step S36), and the preset value Pr of the phase shift angle is given to the resultant Q value (step S37) whereas the value Pr is zero in this example as described above.

By reciprocating the aforementioned process, five initial electrical angles are obtained at each four ECU pulses.

The case where any rising edge of the ECU pulses coincides with any zero-cross point of the alternating voltage as in this example, would occur if a relative angle between the motor 11 and the electric generator 13 was properly regulated in advance. Such regulation can be readily executed if the ECU pulses and the generated voltage are observed by means of an oscilloscope and the angle is mechanically regulated and then fixed under such observation. As the relative angle between the motor 11 and the electric generator 13 is once regulated and fixed typically at a time of production of the inverter generator, no further regulation is required later.

Figure 8:
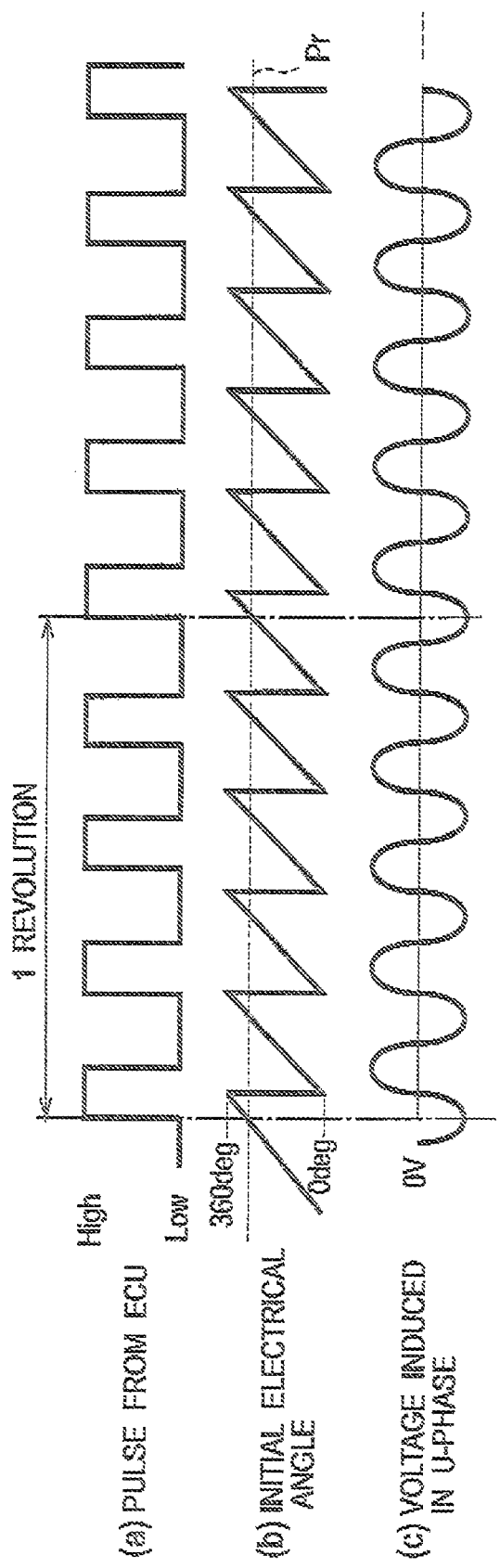
FIG. 8 is a timing chart among ECU pulses, an electrical angle, and a voltage wave induced in an electric generator in a case where rising edges of the ECU pulses form some phase shift relative to zero cross points of the voltage wave.

If such regulation is not executed in advance or displacement occurs, rising edges of ECU pulses steadily have a phase shift from zero-cross points of the alternating voltage as shown in FIG. 8. In this case, a phase shift angle should be taken into account. A method thereof will be described hereinafter.

Before operation of the generator, ECU pulses and generated voltage are observed by means of an oscilloscope. On these waves, a proper rising edge of the ECU pulses and a proper zero-cross point of the alternating voltage are selected and then a phase shift therebetween is measured. Then the measured value is given to the preset value Pr. The preset value Pr is preferably stored in an EEPROM or a memory with battery backup included in the estimating means 14$a$ in advance. When the inverter generator 100 is started, the stored data is read out and then given to the preset value Pr. The preset value Pr is used in the aforementioned process of the initial electrical angle estimation shown in FIG. 7 and thereby the estimation process can be executed in substantially the same way.

The phase shift angle $\Phi$ can be estimated in a different way, on the basis of proper calculations described hereinafter.

Figure 9:
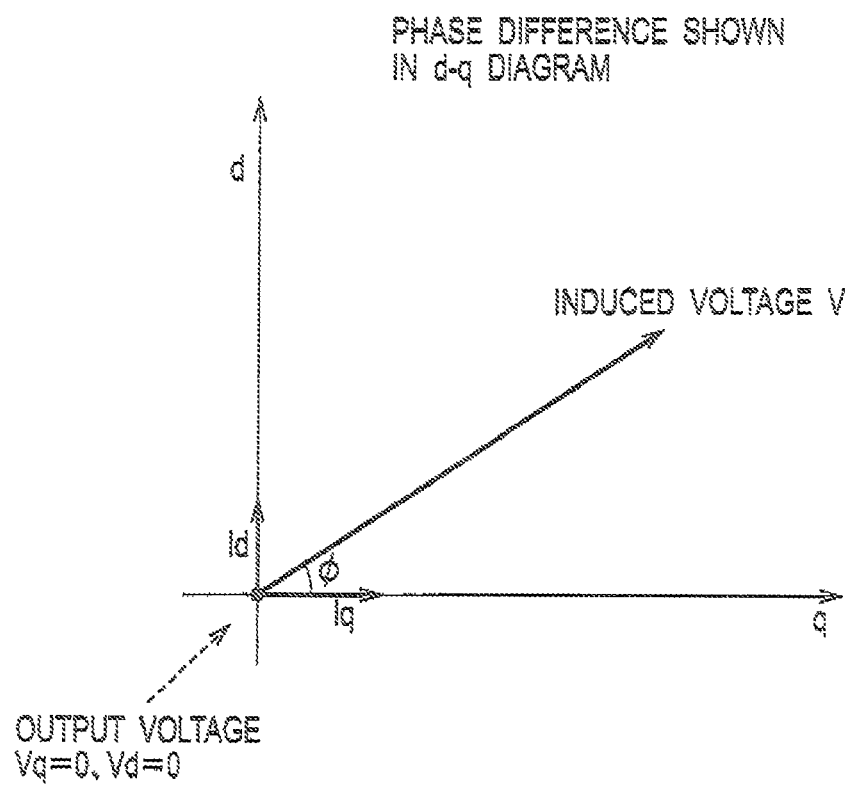
FIG. 9 is a vector diagram on a d-q plane depicting that induced voltage forms an angle $\Phi$ relative to the q-axis.

FIG. 9 illustrates a vector diagram of generated alternating voltage on a d-q plane, which has a phase shift angle $\Phi$ relative to the q-axis, where the q-axis is parallel to a magnetic flux in the generator and the d-axis is electrically perpendicular thereto, as in common d-q axes analyses.

The converter 14 is, as its original common function, capable of outputting q-axis voltage and d-axis voltage. When both the q-axis voltage (Vq) and the d-axis voltages (Vd) are zero, a-axis current (Iq) and d-axis current (Id) flow under a given induced voltage V and a given shift angle $\Phi$. Then relations among Vq, Vd, Iq, Id and $\Phi$ can be expressed in the following equations.

$$Vq = V\cos\Phi + R \cdot Iq - p \cdot \omega \cdot Ld \cdot Id \quad (2), \text{ and}$$

$$Vd = V\sin\Phi + R \cdot Id - - p \cdot \omega \cdot Lq \cdot Iq \quad (3),$$

where R represents a resistance, Lq represents a q-axis inductance, Ld represents a d-axis inductance, p represents the number of pole pairs, and w represents an angular velocity.

When the converter 14 outputs voltage of Vq=Vd=0, cos $\Phi$ and sin $\Phi$ are expressed by the following equations.

$$\cos\Phi = -(R \cdot Iq - p\omega Ld \cdot Id)/V \quad (4)$$

$$\sin\Phi = -(R \cdot Id - p \cdot \omega \cdot Lq \cdot Iq)/V \quad (5)$$

Based on the equation (5), the angle $\Phi$ ($\Phi s$, hereinafter) can be expressed by the following equation.

$$\Phi s = \sin^{-1}\{-(R\ Id - p \cdot \omega \cdot Lq \cdot Iq)/V\} \quad (6)$$

Based on the equation (4), the angle $\Phi$($\Phi c$, hereinafter) can be also expressed by the following equation.

$$\Phi c = \cos^{-1}\{-(R \cdot Ig - p \cdot \omega \cdot Ld \cdot Id)/V\} \quad (7)$$

The angles $\Phi s$ and $\Phi c$ are supposed to be within a range of ±0.45 degrees.

Figure 11:
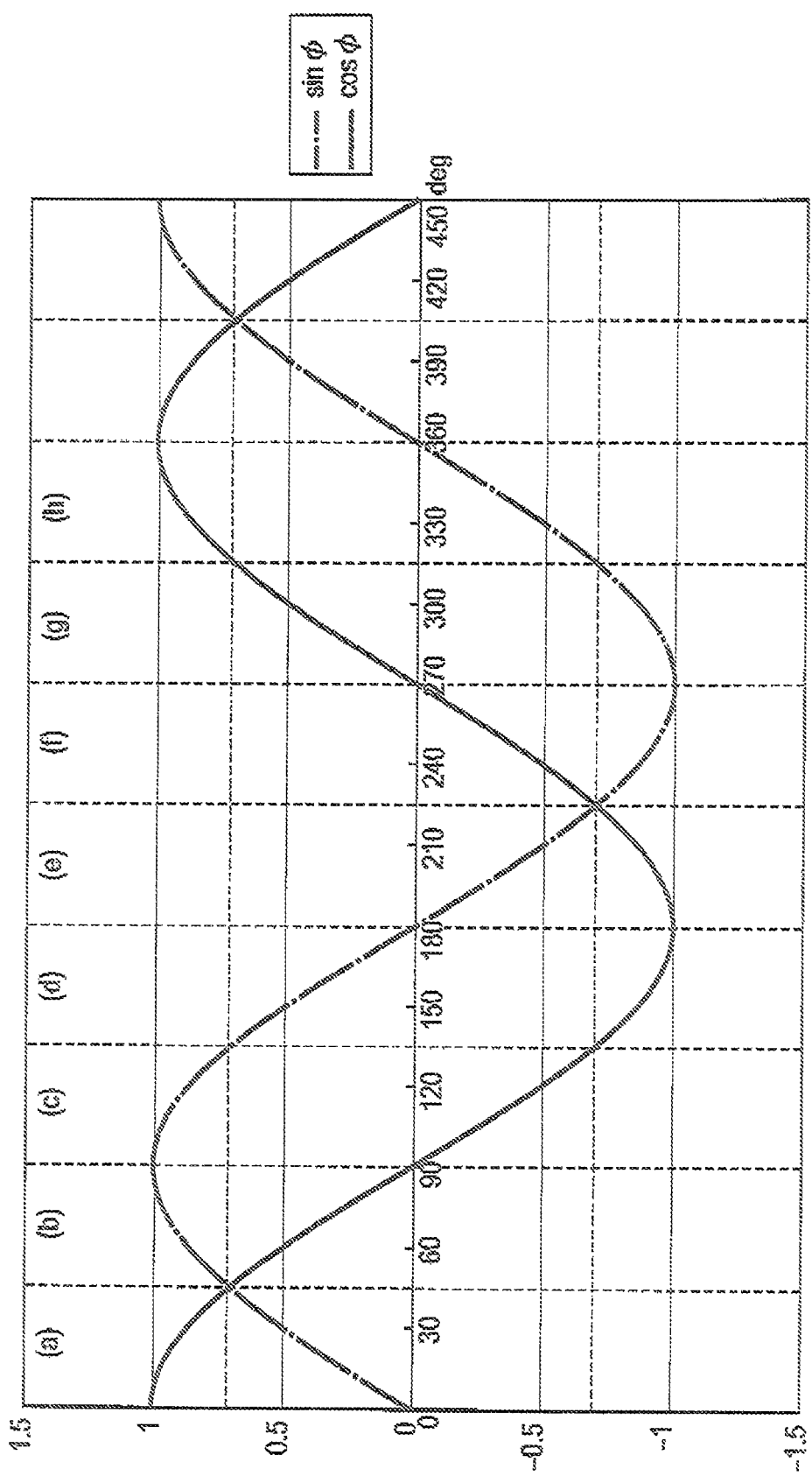
FIG. 11 is a waveform diagram of sine and cosine waves.

Depending on values of sin $\Phi$ and cos $\Phi$, each case falls within any of regions a through h as shown in FIG. 11 and described below.

Region a: cos $\Phi$>0, sin $\Phi$>0, | cos $\Phi$|>| sin $\Phi$|$\Phi$=$\Phi s$
Region b: cos $\Phi$>0, sin $\Phi$>0, | cos $\Phi$|≤|sin $\Phi$|$\Phi$=$\Phi c$
Region c: cos $\Phi$<0, sin $\Phi$>0, | cos $\Phi$|<|sin $\Phi$|$\Phi$=$\Phi c$
Region d: cos $\Phi$<0, sin $\Phi$>0, | cos $\Phi$|≥| sin $\Phi$|$\Phi$=$\Phi s$
Region e: cos $\Phi$<0, sin $\Phi$<0, | cos $\Phi$|>| sin $\Phi$|$\Phi$=$\Phi s$
Region f: cos $\Phi$<0, sin $\Phi$<0, | cos $\Phi$|<| sin $\Phi$|$\Phi$=$\Phi c$
Region g: cos $\Phi$>0, sin $\Phi$<0, | cos $\Phi$|<| sin $\Phi$|$\Phi$=$\Phi c$
Region h: cos $\Phi$>0, sing $\Phi$<0, | cos $\Phi$|≥| sin $\Phi$|$\Phi$=$\Phi s$ The values R, Lq, Ld, and p in the equations (6) and (7) can be measured in advance and the value $\omega$ can be also measured by measuring the ECU pulses. Thus the phase shift angle $\Phi$ can be evaluated by calculation. The voltage V can be expressed by an equation V=Kv$\omega\omega$, where Kv is the induced voltage constant. As the constant Kv can be also measured in advance, the induced voltage V can be Calculated in advance.

This classification is in advance broken down to a data table and then stored in a proper storage such as an EEPROM or a memory with battery backup. The estimating circuit 14$a$ refers the data table to determine whether $\Phi s$ or $\Phi c$ should be selected and then adopts the selected one as $\Phi$.

The aforementioned estimation process needs to input the q-axis current Iq and the d-axis current Id into the estimating circuit 14$a$. A circuit as shown in FIG. 10 may be used fox this purpose.

Figure 10:
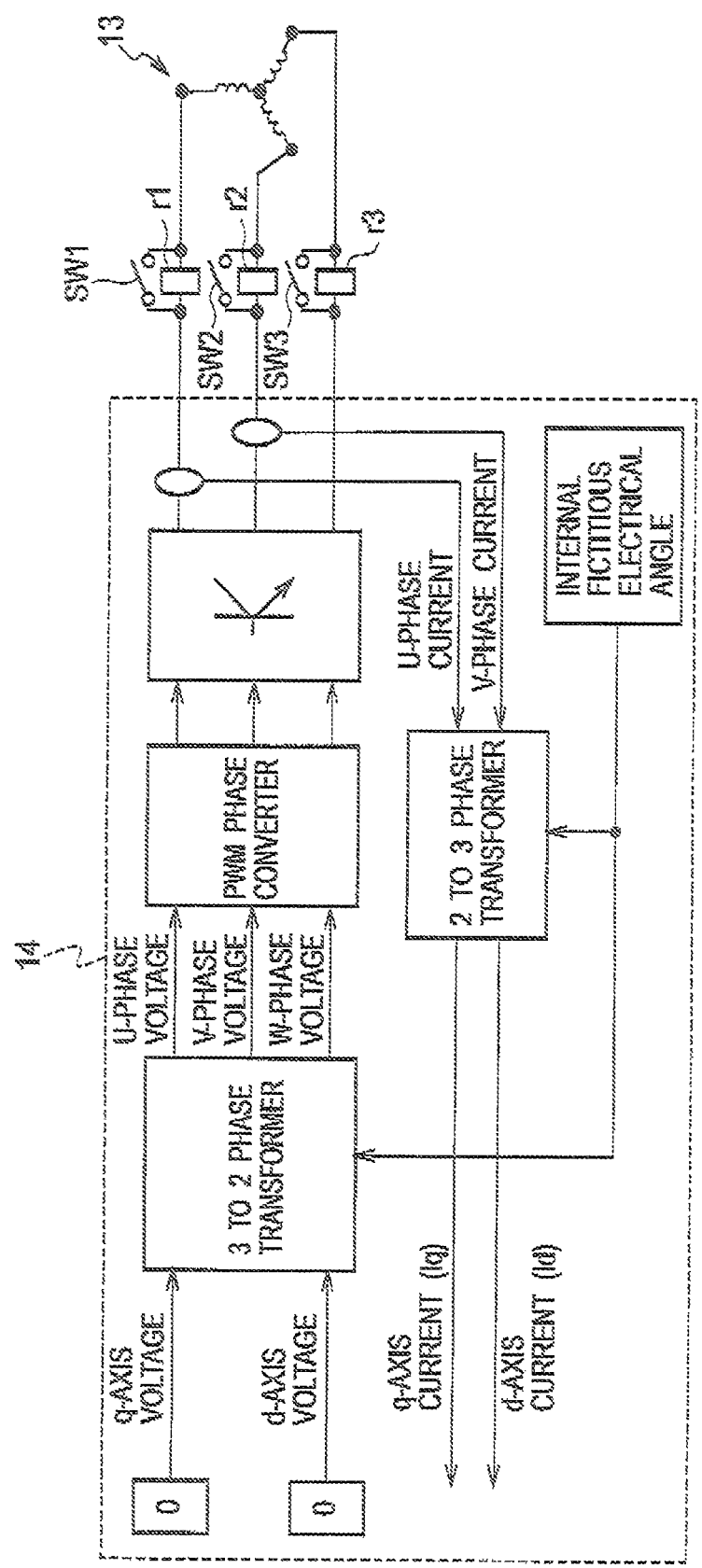
FIG. 10 is a block diagram of the inverter generator in which d-axis current and q-axis current are measured to execute d-q control.

The circuit shown in FIG. 10 is, as compared with the circuit shown in FIG. 1, further comprised of a 3-to-2 phase transformer electrically connected with the U-phase line and the V-phase line to receive U-phase current and V-phase current. The phase transformer refers fictitious electrical angle to convert the U-phase current and the V-phase current into the q-axis current Iq and the d-axis current Id. The fictitious electrical angle is in advance stored in a proper storage such as an EEPROM or a memory with battery backup.

It is required to set both the q-axis voltage Vq and the d-axis voltage Vd to be zero when measuring the phase shift angle $\Phi$ as described above. This condition, however, may give rise to over current flow in the generator 13. To avoid over current flow, resistors may be respectively connected in series with the U-, V-, W-phase lines, instead of the electrical generator 13. For this purpose, the circuit shown in FIG. 10 is comprised of resistors r1, r2, r3 respectively connected in series with the U-, V-, W-phase lines, and switches SW1, SW2, SW3 connected in parallel with the resistors r1, r2, r3.

Further, it may be sufficient for measurement to keep this condition (V=0) for a proper duration that is five times longer or so than time constants of resistances and inductances of the generator 13. Such a relatively short duration is beneficial to avoid overload on the motor 11.

The measured phase shift angle $\Phi$ is kept constant while relation between the motor 11 and the generator 13 is not changed. Thus once the measurement is executed, no more measurement is not required in general. The measured phase shift angle $\Phi$ may be stored in a proper storage such as an EEPROM or a memory with battery backup.

After estimating the initial electrical angle, the converter IA is made under control based on the estimated initial electrical angle. Next the inverter generator 100 shifts to a continuously estimating mode (step S15).

Figure 12:
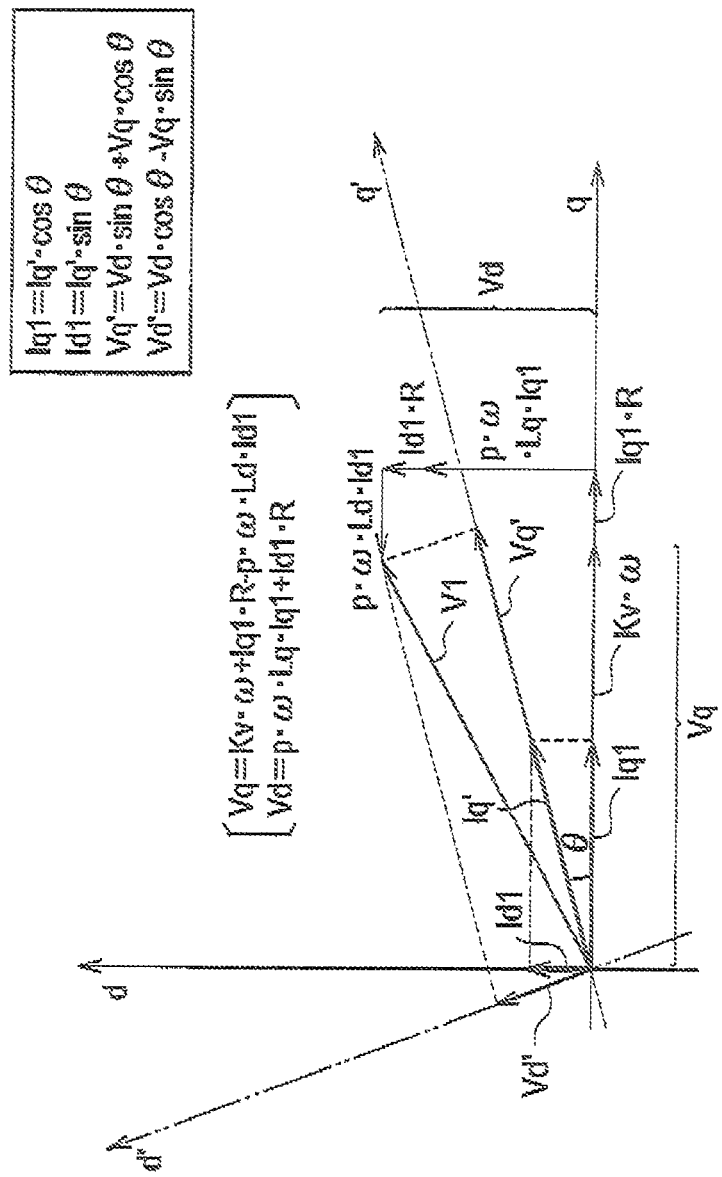
FIG. 12 is a vector diagram depicting a difference of a current measured on d-q axes from that measured on d'-q' axes having an inclination from the d-q axes.
Figure 13:
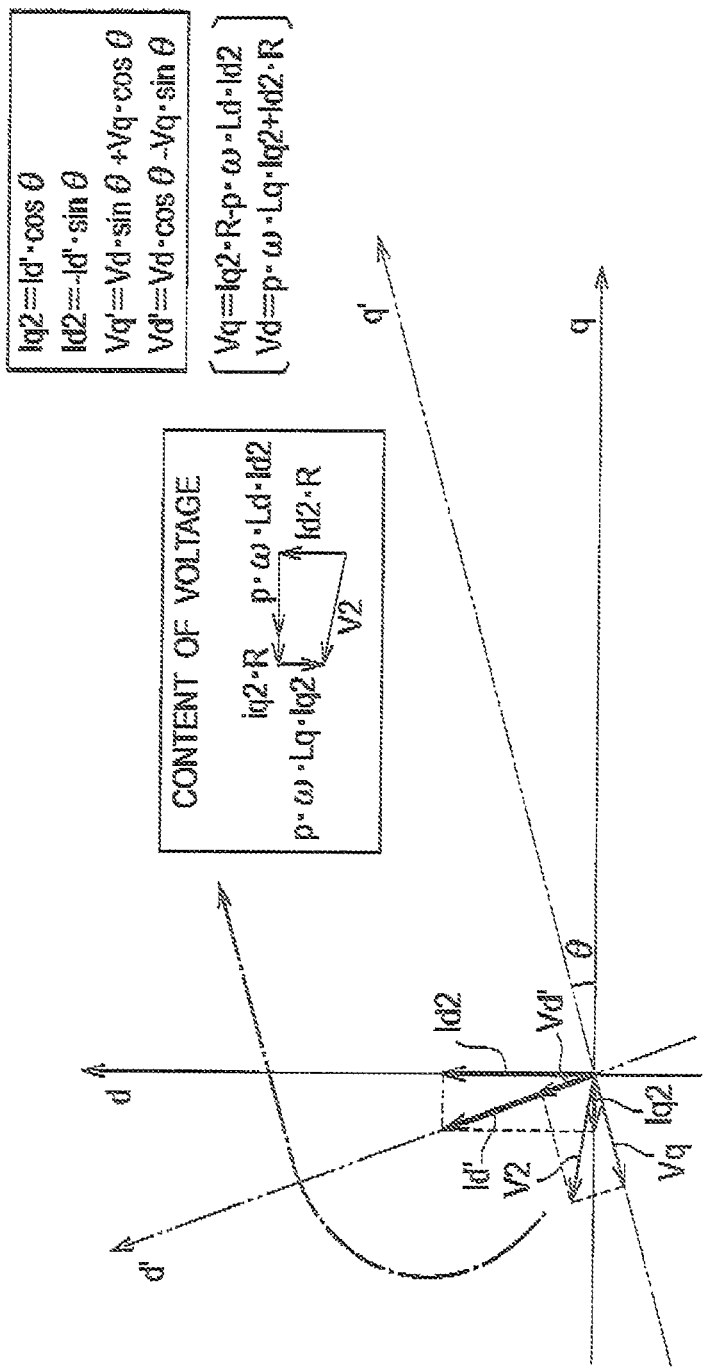
FIG. 13 is another vector diagram depicting a difference of a current measured on d-q axes from that measured on d'-q' axes having an inclination from the d-q axes.

FIGS. 12 and 13 illustrate vector diagrams of generated alternating voltage on a d-q plane and a d'-q' plane, where the d'-, q'-axes are at the fictitious electrical angle θ away from the d-, q-axes.

Induced voltage generated by the electrical generator 13 is represented by Kv·$\omega$, which appears on the q-axis. When the induced voltage Kv·$\omega$ is to be controlled by feedback currents on the d'-q' axes, what are directly controlled are q'-axis current Iq' (see FIG. 12) and d'-axis current Id' (see FIG. 13).

Referring to FIG. 12, the current Iq' is resolved into currents Iq1, Id1 respectively on the d-q axes. These current components induce voltage drops of Iq1·R by the resistance R and p·ω·Lq·Iq1 by the inductance Lq on the q-axis, and further induce voltage drops of Id1·R by the resistance R and p·ω·Ld·Id1 by the inductance Ld on the d-axis. These voltage drops are added to the induced voltage Kv·ω) (the q-axis voltage Vq). As a result, vector summation of them, namely V1, appears on the d-q plane, which is corresponding to induced voltage at the electrical generator 13 when control merely by the q'-axis current Iq' is applied.

Similar arguments apply to FIG. 13. The current Id' is similarly resolved into currents Iq2, Id2. These current components induce voltage drops of Ig2·R by the resistance R and p·ω·Lq·Iq2 by the inductance Lq on the q-axis, and further induce voltage drops of Id2R by the resistance R and p·ω·Ld·Id2 by the inductance Ld on the d-axis. Vector summation of them, namely V2, appears on the d-q plane, which is corresponding to induced voltage at the electrical generator 13 when control merely by the d'-axis current Id' is applied.

Practically these voltages V1, V2 should be summed up. The d'-axis voltage Vd' on the d'-axis shown in FIGS. 12, 13 is represented by the following equation.

$$Vd' = -Kv \cdot \omega \cdot \sin\theta + p \cdot \omega \cdot Iq' \cdot (Ld \cdot \sin 2\theta + Lq \cdot \cos 2\theta) + \\ Id' \cdot R + p \cdot \omega \cdot (Ld - Lq) \cdot Id' \cdot \sin\theta \cdot \cos\theta \quad (8)$$

If the non-salient pole motor is applied to the electric generator 13, Lq is substantially equal to Ld. Thus Lq is substituted for Ld, and then the equation (8) is solved in regard to sin θ to give the following equation (9).

$$\sin\theta = (p \cdot \omega \cdot Lq \cdot Iq' + Id' \cdot Vd')/(Kv \cdot \omega) \quad (9)$$

When θ is relatively small, like as a range −30 degrees <θ<30 degrees, it can be considered that sine is substantially equal to θ. Thus the equation (9) gives the following equation (10).

$$\Theta = (p \cdot \omega \cdot Lq \cdot Iq' + Id' \cdot R - Vd')/(Kv \cdot \omega) \quad (10)$$

As the respective values Ig', Id', and Vd' in this equation can be steadily measured while the converter 14 executes d-q control, the realtime measurement of the phase shift angle θ can be continuously executed. This is the case even when the phase shift angle θ changes after the initial electrical angle is estimated at the step S12. Thus the continuous electrical angle can be estimated on the basis of the measured phase shift angle θ.

Although a non-salient pole motor is exemplified as the electric generator in the description above, a salient pole motor may be of course used.

The continuous electrical angle may be used to control the phase shift angle θ to be steadily zero. This leads to better efficiency in control of the generator.

Figure 14:
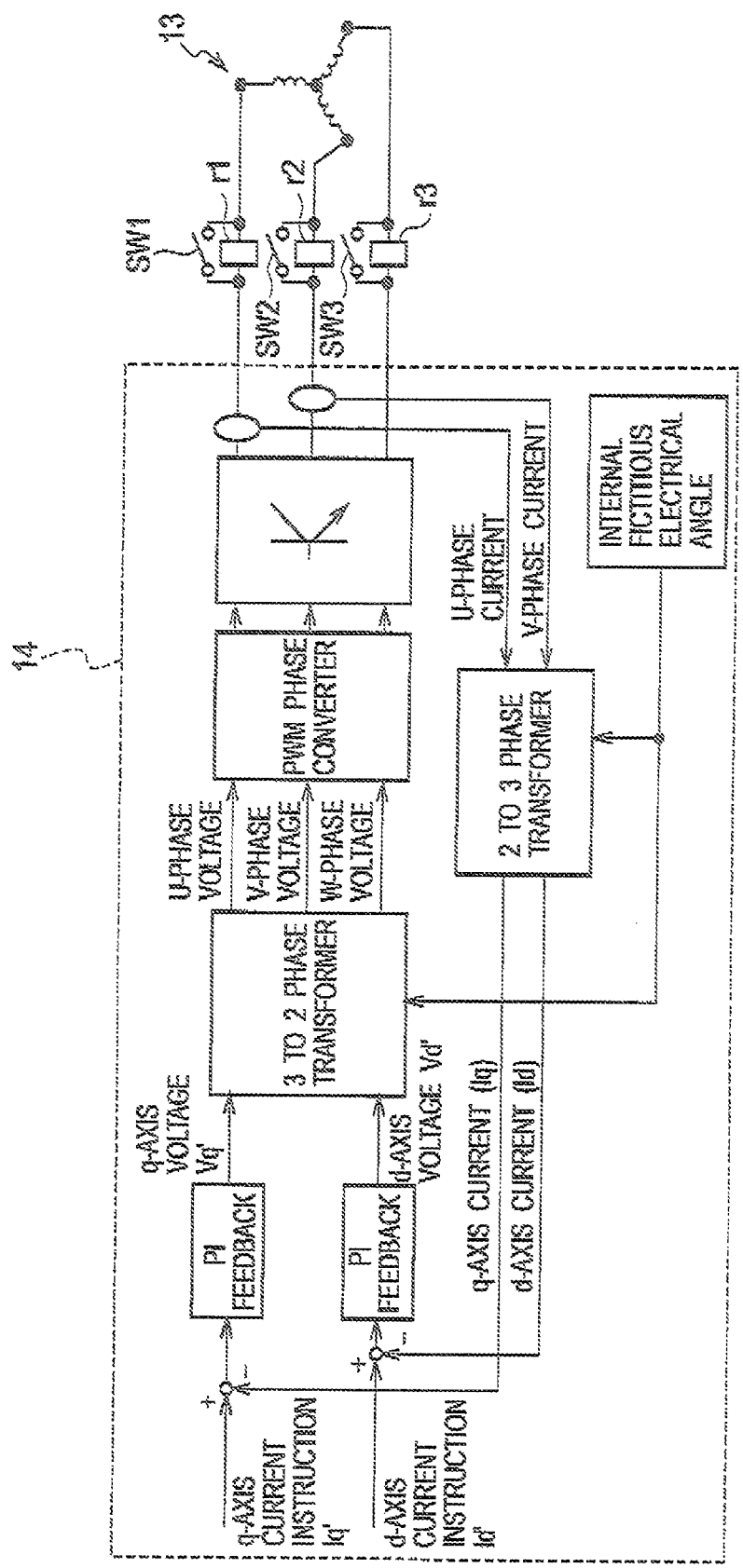
FIG. 14 is a block diagram of the inverter generator in which d-axis current and a-axis current are measured to execute a PI compensation.

A circuit as shown in FIG. 14 may be used to execute d-q control on the basis of the estimated continuous electrical angle. The circuit shown in FIG. 14 is, as compared with the circuit shown in FIG. 1, further comprised of connection between the 3-to-2 phase transformer and the converter 14 so as to execute feedback control of the converter 14. To the converter 14, q-axis current instruction Iq' and d-axis current instruction Id' are input. The q-axis current Iq and the d-axis current Id are respectively given to these instructions Iq' and Id' as feedback, thereby executing d-q control.

Although the aforementioned description is directed to a case where the ECU 19 is used to output a signal of an impulse tachometer or a tacho-sensor, an impulse tachometer or a tacho-sensor of itself may be instead used in the embodiment.

The aforementioned embodiment enables estimation of an electrical angle without a specially added sensor on a synchronous electric motor. Even though a sensor on a synchronous electric motor is omitted, the present embodiment retains the function of measurement of electrical angles as with the prior art. The embodiment only requires an ordinary construction combined with the inverter generator as described above Although the invention has been described above by reference to certain embodiments of the invention, the invention is not limited to the embodiments described above. Modifications and variations of the embodiments described above will occur to those skilled in the art, in light of the above teachings.

What is claimed is:

1. An inverter generator used in combination with a motor and an ECU generating a pulse at each predetermined rotation angle of the motor, the inverter generator comprising:
    an electric generator driven by the motor configured to generate alternating current electric power;
    a circuit constructed and arranged to estimate an initial electrical angle of alternating voltage of the alternating current electric power from the pulse and calculate a phase shift angle from a difference of estimated d'-q' axes from d-q axes of the alternating voltage of the alternating current electric power to estimate a continuous electrical angle of the alternating voltage of the alternating current electric power, the circuit being electrically connected with the ECU;
    a converter configured to convert the alternating current electric power into direct current electric power under d-q control based on the phase shift angle, the converter electrically connected with the electric generator and the circuit;
    an inverter configured to convert the direct current electric power into alternating current output electric power, the inverter electrically connected with the converter; and
    a shift drivingly coupling the motor with the electric generator so as to adjust a rising edge of the pulse with a zero-cross point of the alternating voltage of the alternating current electric power.

2. An inverter generator used in combination with a motor and an ECU generating a pulse at each predetermined rotation angle of the motor, the inverter generator comprising:
    an electric generator driven by the motor configured to generate alternating current electric power;
    a circuit constructed and arranged to estimate an initial electrical angle of alternating voltage of the alternating current electric power from the pulse and calculating a phase shift angle from a difference of estimated d'-q' axes from d-q axes of the alternating voltage of the alternating current electric power to estimate a continuous electrical angle of the alternating voltage of the alternating current electric power, the circuit being electrically connected with the ECU;
    a converter configured to convert the alternating current electric power into direct current electric power under d-q control based on the phase shift angle, the converter electrically connected with the electric generator and the circuit;
    an inverter configured to convert the direct current electric power into alternating current output electric power, the inverter electrically connected with the converter; and
    wherein the circuit compares a rising edge of the pulse with a zero-cross point of the alternating voltage of the alternating current electric power to obtain a preset phase shift value for estimating the initial electrical angle.

3. The inverter generator of claim 2, wherein the circuit calculates the preset phase shift value on the basis of current flowing through the electric generator when a q-axis voltage and a d-axis voltage of the electric generator are zero.

4. The inverter generator of claim 2, wherein the circuit calculates the phase shift angle by an equation $\theta=(p\cdot\omega\cdot Lq\cdot Iq'+Id'R-Vd)/(Kv\cdot\omega)$, where $\theta$ represents the phase shift angle, p represents the number of pole pairs of the electric generator, $\omega$ represents an angular velocity of the electric generator, Lq represents a d-axis inductance, R represents a resistance, Kv represents an induced voltage constant, Iq' represents a q'-axis current, and Id' represents a d'-axis current.

5. The inverter generator of claim 2, wherein the circuit calculates the phase shift angle by an equation $\theta=(p\cdot\omega\cdot Lq\cdot Iq'+Id'-R-Vd)/(Kv\cdot\omega)$, where $\theta$ represents the phase shift angle, p represents the number of pole pairs of the electric generator, $\omega$ represents an angular velocity of the electric generator, Lq represents a d-axis inductance, R represents a resistance, Kv represents an induced voltage constant, Iq' represents a q'-axis current, and Id' represents a d'-axis current.

6. The inverter generator of claim 3, wherein the circuit calculates the phase shift angle by an equation $\theta=(p\cdot\omega\cdot Lq\cdot Iq'+Id'\cdot R-Vd)/(Kv\cdot\omega)$, where $\theta$ represents the phase shift angle, p represents the number of pole pairs of the electric generator, $\omega$ represents an angular velocity of the electric generator, Lq represents a d-axis inductance, R represents a resistance, Kv represents an induced voltage constant, Iq' represents a q'-axis current, and Id' represents a d'-axis current.

* * * * *